(12) United States Patent
Hellail et al.

(10) Patent No.: US 9,841,343 B1
(45) Date of Patent: Dec. 12, 2017

(54) BLOWOUT PREVENTER (BOP) TEST TOOL AND METHODS

(71) Applicant: SAMOCO OIL TOOLS, INC., Houston, TX (US)

(72) Inventors: Michael Jeremy Hellail, Houston, TX (US); Mahammad Aloudat, Spring, TX (US); Ranfis Miguel Ramirez, Katy, TX (US)

(73) Assignee: SAMOCO OIL TOOLS, INC., Houston, TX (US)

( * ) Notice: Subject to any disclaimer, the term of this patent is extended or adjusted under 35 U.S.C. 154(b) by 0 days.

(21) Appl. No.: 15/343,467

(22) Filed: Nov. 4, 2016

Related U.S. Application Data

(60) Provisional application No. 62/338,207, filed on May 18, 2016.

(51) Int. Cl.
   *G01M 3/02* (2006.01)
   *E21B 33/06* (2006.01)

(52) U.S. Cl.
   CPC .............. *G01M 3/02* (2013.01); *E21B 33/06* (2013.01)

(58) Field of Classification Search
   None
   See application file for complete search history.

(56) References Cited

U.S. PATENT DOCUMENTS

| | | | |
|---|---|---|---|
| 6,032,736 A | 3/2000 | Williams | |
| 6,044,690 A | 4/2000 | Williams | |
| 9,470,082 B1 | 10/2016 | Williams et al. | |
| 2003/0024709 A1* | 2/2003 | Cuppen | E21B 33/0355 166/382 |
| 2013/0153244 A1* | 6/2013 | Nikiforuk | E21B 19/16 166/380 |

FOREIGN PATENT DOCUMENTS

WO  WO 2015/112021 A1  7/2015

OTHER PUBLICATIONS

Universal Sub-Sea Test Joint Procedures, NuTec, Inc., 1 page, accessed at www.nutecinc.com on Aug. 24, 2016.
Universal Test Joint (UTJ) Diagrams, NuTec, Inc., 3 pages, accessed at www.nutecinc.com on Aug. 24, 2016.

* cited by examiner

*Primary Examiner* — Robert R Raevis
(74) *Attorney, Agent, or Firm* — Haynes and Boone, LLP

(57) ABSTRACT

A test tool and related method for testing a blowout preventer (BOP). The test tool includes a first sub, a first pipe adapted to be connected to, and disconnected from, the first sub, the first pipe including an external spline, a second sub adapted to be connected to, and disconnected from, the first sub, the second sub including an internal spline adapted to engage the external spline of the first pipe, and a second pipe adapted to be connected to the second sub. The test tool includes an operational configuration in which the internal spline of the second sub engages the external spline of the first pipe so that a torque is transferable from the second sub to the first pipe via at least the engagement between the internal spline and the external spline. One or more high pressure low torque (HPLT) connections are incorporated into the test tool.

12 Claims, 12 Drawing Sheets

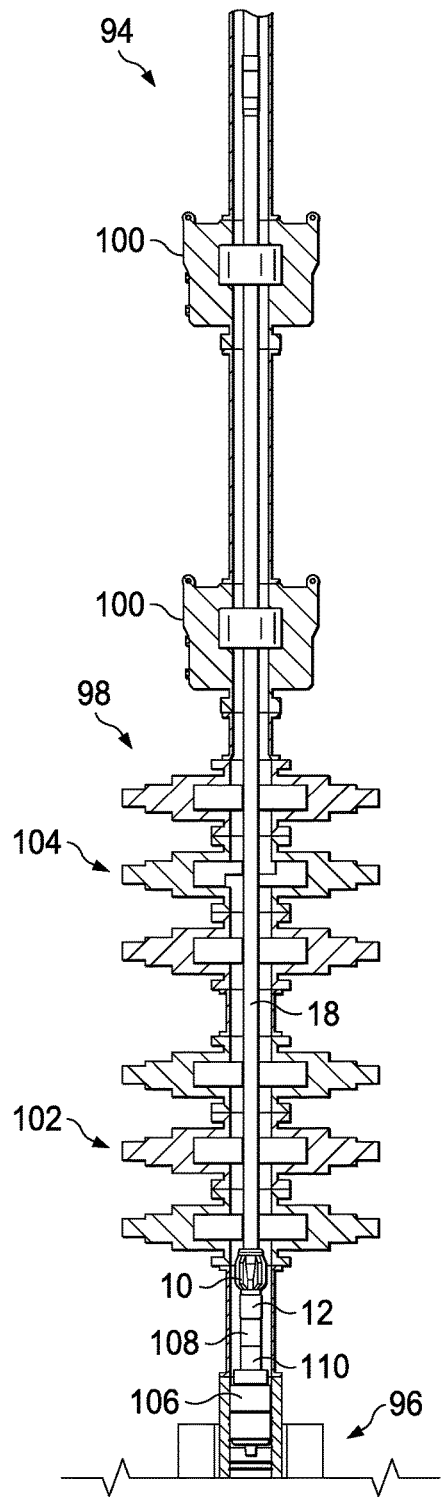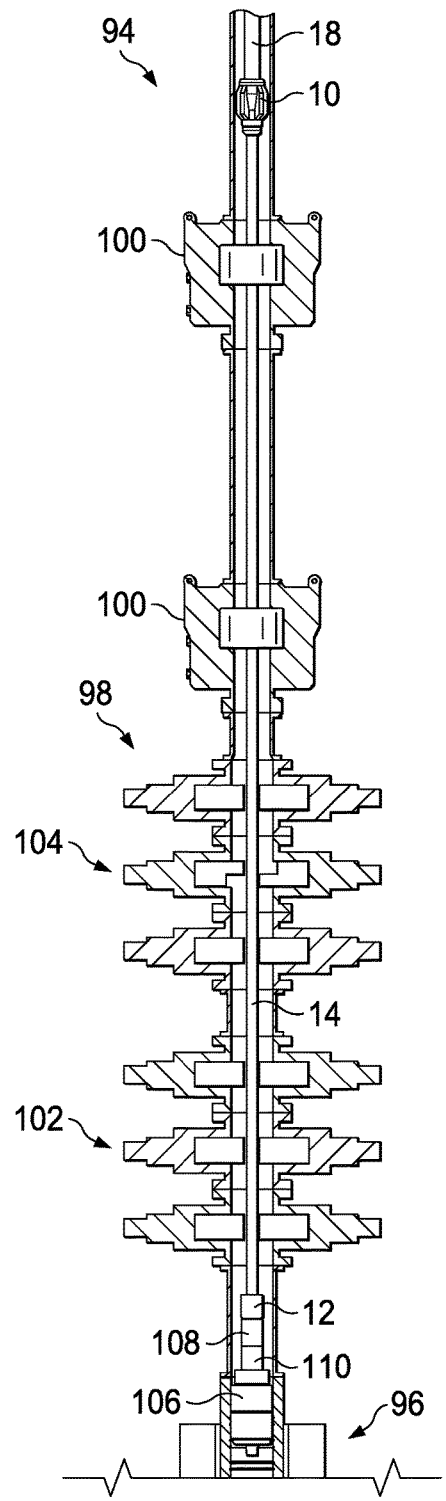
Fig. 14
Fig. 15

BLOWOUT PREVENTER (BOP) TEST TOOL AND METHODS

CROSS-REFERENCE TO RELATED APPLICATION

This application claims the benefit of the filing date of, and priority to, U.S. Application No. 62/338,207, filed May 18, 2016, the entire disclosure of which is hereby incorporated herein by reference.

BACKGROUND

This disclosure relates in general to blowout preventers (BOPs) used in oil and gas exploration and production operations and, in particular, to a BOP test tool for testing BOPs, as well as to one or more high pressure low torque (HPLT) connections that are incorporated into the test tool.

BRIEF DESCRIPTION OF THE DRAWINGS

FIG. 14 is an elevational view of a system including a wellhead having a blowout preventer operably coupled thereto, the wellhead being sealingly engaged by a plug to which the test tool of FIGS. 1-13 is operably coupled in the first operational configuration, according to an exemplary embodiment.

FIG. 15 is an elevational view of the system of FIG. 14, the wellhead being sealingly engaged by a plug to which the test tool of FIGS. 1-13 is operably coupled in the second operational configuration, according to an exemplary embodiment.

DETAILED DESCRIPTION

Figure 1:
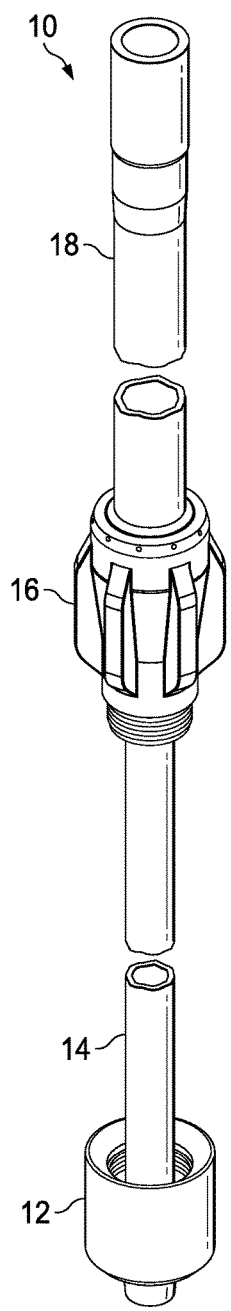
FIG. 1 is a perspective view of a test tool for a blowout preventer, the test tool including a bottom sub, a small pipe, a lower pin sub, and a large pipe, according to an exemplary embodiment.

In an exemplary embodiment, as illustrated in FIG. 1, a blowout preventer (BOP) test tool is generally referred to by the reference numeral 10, and includes a bottom sub 12, a small pipe 14, a lower pin sub 16, and a large pipe 18. In one operational configuration, the small pipe 14 and the lower pin sub 16 are each connected to the bottom sub 12, the large pipe 18 is connected to the lower pin sub 16, and the small pipe 14 extends within the bottom sub 12, the lower pin sub 16, and the large pipe 18. In another operational configuration (shown in FIG. 1), the lower pin sub 16 is disconnected from the bottom sub 12 and the small pipe 14 extends within the bottom sub 12 and the lower pin sub 16. In yet another operational configuration, the small pipe 14 is disconnected from the bottom sub 12. In operation, the test tool 10 is actuable between the above-described operational configurations to test a blowout preventer, as will be discussed in further detail below.

Figure 2:
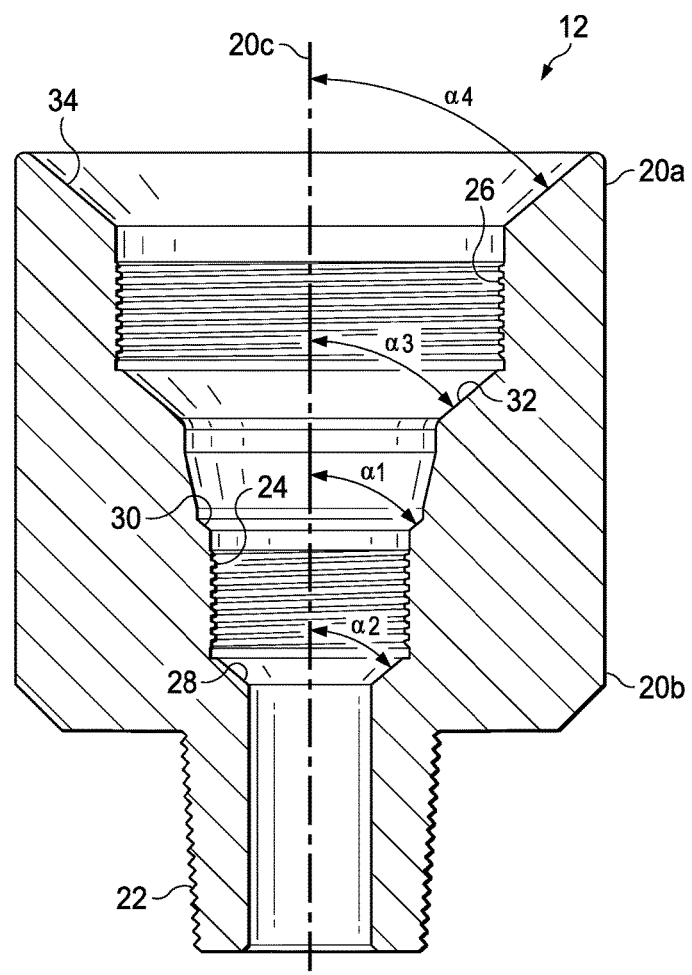
FIG. 2 is a sectional view of the bottom sub of FIG. 1, according to an exemplary embodiment.

In an exemplary embodiment, as illustrated in FIG. 2 with continuing reference to FIG. 1, the bottom sub 12 is a generally tubular member defining upper and lower end portions 20a and 20b, and a longitudinal axis 20c. The bottom sub 12 includes a lower pin connection 22 at the lower end portion 20b thereof. In an exemplary embodiment the lower pin connection 22 is a 4½" IF external threaded connection. In several exemplary embodiments, instead of a 4½" IF external threaded connection, the lower pin connection 22 is one of a wide variety of other types and/or sizes of threaded connections. A pair of internal threaded connections 24 and 26 are formed in the interior of the bottom sub 12. The internal threaded connection 26 is relatively larger than the internal threaded connection 24, and is located proximate the upper end portion 20a of the bottom sub 12. The internal threaded connection 24 is located axially between the lower pin connection 22 and the internal threaded connection 26.

Generally frusto-conical surfaces 28, 30, 32, and 34 are also formed in the interior of the bottom sub 12. The surfaces 30 and 32 are located axially between the internal threaded connections 24 and 26. The surface 28 is located on a side of the internal threaded connection 24 opposite the surface 30, at or near the lower end portion 20b of the bottom sub 12. The surface 34 is located on a side of the internal threaded connection 26 opposite the surface 32, at or near the upper end portion 20a of the bottom sub 12.

In an exemplary embodiment, the surface 30 adjoins the internal threaded connection 24 and extends upwardly and radially outwardly therefrom (as viewed in FIG. 2). The surface 30 defines an angle α1 with respect to the longitudinal axis 20c of the bottom sub 12. In several exemplary embodiments, the angle α1 is about 50 degrees. In several exemplary embodiments, the angle α1 is about 45 degrees. In several exemplary embodiments, the angle α1 is between 45 and 50 degrees. In several exemplary embodiments, the angle α1 is between 40 and 55 degrees.

In an exemplary embodiment, the surface 28 adjoins the internal threaded connection 24 and extends downwardly and radially inwardly therefrom (as viewed in FIG. 2). However, the surfaces 28 and 30 need not adjoin the internal threaded connection 24. The surface 28 defines an angle α2 with respect to the longitudinal axis 20c of the bottom sub 12. In several exemplary embodiments, the angle α2 is about 50 degrees. In several exemplary embodiments, the angle α2 is about 45 degrees. In several exemplary embodiments, the angle α2 is between 45 and 50 degrees. In several exemplary embodiments, the angle α2 is between 40 and 55 degrees.

In an exemplary embodiment, the surface 32 adjoins the internal threaded connection 26 and extends downwardly and radially inwardly therefrom (as viewed in FIG. 2). The surface 32 defines an angle α3 with respect to the longitudinal axis 20c of the bottom sub 12. In several exemplary embodiments, the angle α3 is about 50 degrees. In several exemplary embodiments, the angle α3 is about 45 degrees. In several exemplary embodiments, the angle α3 is between 45 and 50 degrees. In several exemplary embodiments, the angle α3 is between 40 and 55 degrees.

In an exemplary embodiment, the surface 34 adjoins the internal threaded connection 26 and extends upwardly and radially outwardly therefrom (as viewed in FIG. 2). However, the surfaces 32 and 34 need not adjoin the internal threaded connection 26. The surface 34 defines an angle α4 with respect to the longitudinal axis 20c of the bottom sub 12. In several exemplary embodiments, the angle α4 is about 50 degrees. In several exemplary embodiments, the angle α4 is about 45 degrees. In several exemplary embodiments, the angle α4 is between 45 and 50 degrees. In several exemplary embodiments, the angle α4 is between 40 and 55 degrees.

Figure 3:
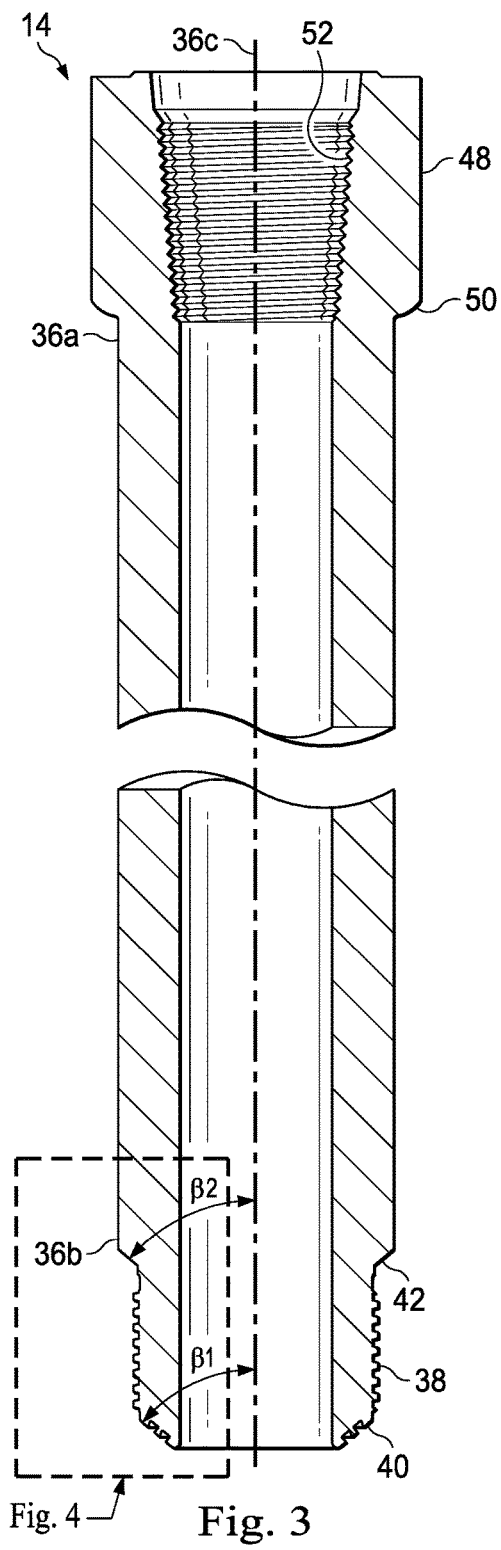
FIG. 3 is a sectional view of the small pipe of FIG. 1, according to an exemplary embodiment.
Figure 4:
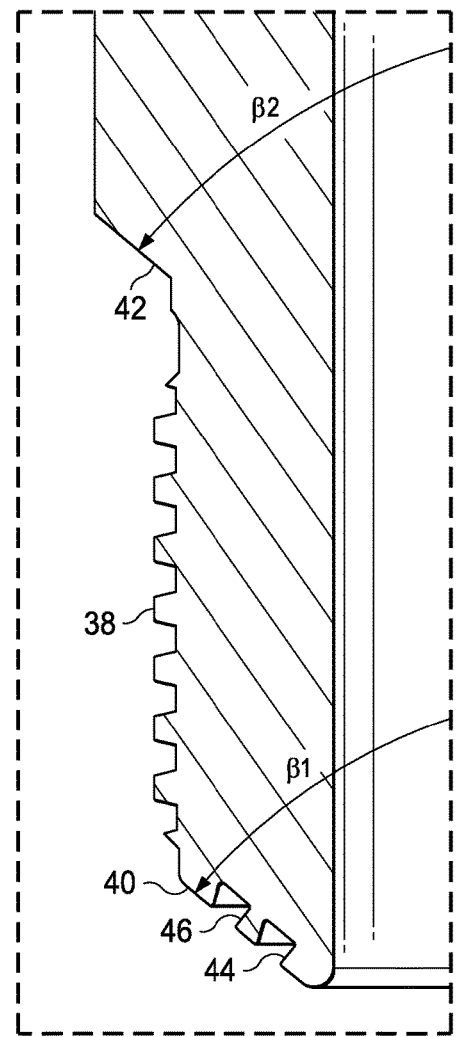
FIG. 4 is an enlarged view of a portion of FIG. 3, according to an exemplary embodiment.

In an exemplary embodiment, as illustrated in FIGS. 3 and 4 with continuing reference to FIG. 1, the small pipe 14 is a generally tubular member defining upper and lower end portions 36a and 36b, and a longitudinal axis 36c. An external threaded connection 38 is formed in the exterior of the small pipe 14 at the lower end portion 36b thereof, and is adapted to engage the internal threaded connection 24 of the bottom sub 12. In an exemplary embodiment, the external threaded connection 38 is 4" stub acme LH thread; in several exemplary embodiments, other thread types and/or sizes may be used. Generally frusto-conical surfaces 40 and 42 (most clearly shown in FIG. 4) are also formed in the exterior of the small pipe 14 at the lower end portion 36b thereof.

In an exemplary embodiment, the surface 40 adjoins the external threaded connection 38 and extends downwardly and radially inwardly therefrom (as viewed in FIG. 4). The surface 40 defines an angle β1 with respect to the longitudinal axis 36c of the small pipe 14. In several exemplary embodiments, the angle β1 is about 50 degrees. In several exemplary embodiments, the angle β1 is about 45 degrees. In several exemplary embodiments, the angle β1 is between 45 and 50 degrees. In several exemplary embodiments, the angle β1 is between 40 and 55 degrees. A pair of annular grooves 44 and 46 are formed in the surface 40 and adapted to accommodate sealing elements 45 and 47 (shown in FIG. 9), respectively, for sealing engagement with the surface 28 of the bottom sub 12.

The surface 42 is located on a side of the external threaded connection 38 opposite the surface 40, and is adapted to engage (or nearly engage) the surface 30 of the bottom sub 12. In an exemplary embodiment, the surface 42 adjoins the external threaded connection 38 and extends upwardly and radially outwardly therefrom (as viewed in FIG. 4). However, the surfaces 40 and 42 need not adjoin the external threaded connection 38. The surface 42 defines an angle β2 with respect to the longitudinal axis 36c of the small pipe 14. In several exemplary embodiments, the angle β2 is about 50 degrees. In several exemplary embodiments, the angle β2 is about 45 degrees. In several exemplary embodiments, the angle β2 is between 45 and 50 degrees. In several exemplary embodiments, the angle β2 is between 40 and 55 degrees.

Figure 12:
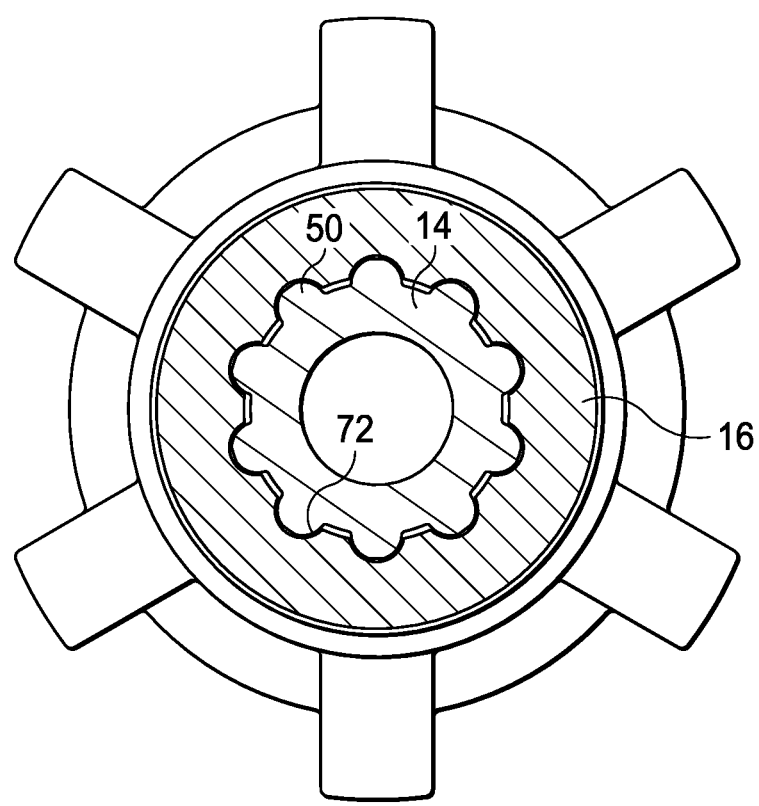
FIG. 12 is an enlarged sectional view taken along the line 12-12 of FIG. 11, according to an exemplary embodiment.

The small pipe 14 further includes a stop collar 48 at the upper end portion 36a thereof, the stop collar 48 including an external spline 50 (most clearly shown in FIG. 12). The stop collar 48 further defines one or more axially-facing external surfaces adapted to engage the lower pin sub 16. The small pipe 14 also includes an upper box connection 52 at the upper end portion 36a thereof. In an exemplary embodiment the upper box connection 52 is a 2⅞" IF internal threaded connection. In several exemplary embodiments, instead of a 2⅞" IF internal threaded connection, the upper box connection 52 is one of a wide variety of other types and/or sizes of threaded connections. In an exemplary embodiment, the small pipe 14 is 4½" pipe. In several exemplary embodiments, the small pipe 14 may be wide variety of sizes, greater in size than 4½" pipe or less in size than 4½" pipe.

Figure 5:
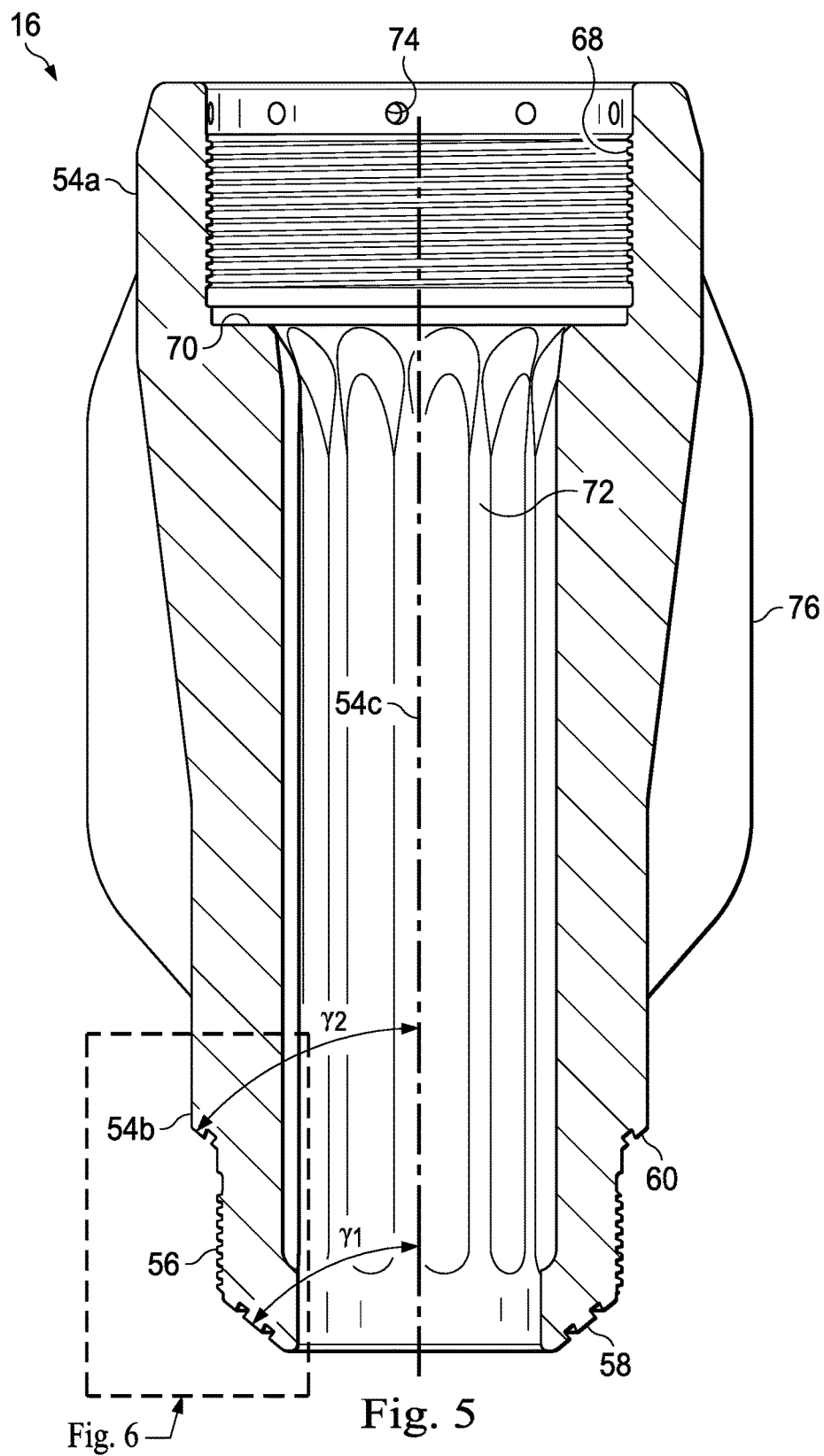
FIG. 5 is a sectional view of the lower pin sub of FIG. 1, according to an exemplary embodiment.
Figure 6:
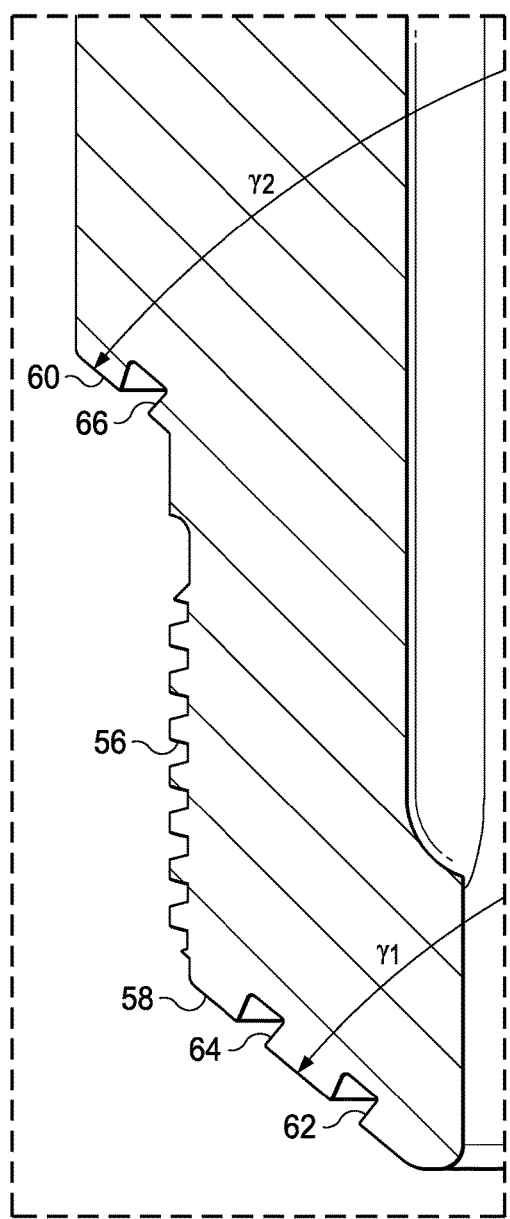
FIG. 6 is an enlarged view of a portion of FIG. 5, according to an exemplary embodiment.

In an exemplary embodiment, as illustrated in FIGS. 5 and 6 with continuing reference to FIG. 1, the lower pin sub 16 is a generally tubular member defining upper and lower end portions 54a and 54b, and a longitudinal axis 54c. An external threaded connection 56 is formed in the exterior of the lower pin sub 16 at the lower end portion 54b thereof, and is adapted to engage the internal threaded connection 26 of the bottom sub 12. In an exemplary embodiment, the external threaded connection 56 is 7⅞" stub acme LH thread; in several exemplary embodiments, other thread types and/or sizes may be used. Generally frusto-conical surfaces 58 and 60 (most clearly shown in FIG. 6) are also formed in the exterior of the lower pin sub 16 at the lower end portion 54b thereof.

In an exemplary embodiment, the surface 58 adjoins the external threaded connection 56 and extends downwardly and radially inwardly therefrom (as viewed in FIG. 6). The surface 58 defines an angle γ1 with respect to the longitudinal axis 54c of the lower pin sub 16. In several exemplary embodiments, the angle γ1 is about 50 degrees. In several exemplary embodiments, the angle γ1 is about 45 degrees. In several exemplary embodiments, the angle γ1 is between 45 and 50 degrees. In several exemplary embodiments, the angle γ1 is between 40 and 55 degrees. A pair of annular grooves 62 and 64 are formed in the surface 58 and adapted to accommodate sealing elements 63 and 65 (shown in FIG. 9), respectively, for sealing engagement with the surface 32 of the bottom sub 12.

The surface 60 is located on a side of the external threaded connection 56 opposite the surface 58. In an exemplary embodiment, the surface 60 adjoins the external threaded connection 56 and extends upwardly and radially outwardly therefrom (as viewed in FIG. 6). However, the surfaces 58 and 60 need not adjoin the external threaded connection 56. In several exemplary embodiments, the surface 60 defines an angle γ2 with respect to the longitudinal axis 54c of the lower pin sub 16. In several exemplary embodiments, the angle γ2 is about 50 degrees. In several exemplary embodiments, the angle γ2 is about 45 degrees. In several exemplary embodiments, the angle γ2 is between 45 and 50 degrees. In several exemplary embodiments, the angle γ2 is between 40 and 55 degrees. An annular groove 66 is formed in the surface 60, and is adapted to accommodate a sealing element 67 (shown in FIG. 9) for sealing engagement with the surface 34 of the bottom sub 12.

The lower pin sub 16 further includes an internal threaded connection 68 at the upper end portion 54a thereof, and an internal shoulder 70 adjacent the internal threaded connection 68. An internal spline 72 is formed in the interior of the lower pin sub 16 on a side of the internal shoulder 70 opposite the internal threaded connection 68. The internal spline 72 is adapted to be engaged by the external spline 50 of the small pipe 14. In several exemplary embodiments, a plurality of circumferentially-spaced threaded holes 74 are formed radially through the lower pin sub 16 adjacent the internal threaded connection 68. In several exemplary embodiments, the lower pin sub 16 further includes a centralizer 76 having a plurality of centralizer blades (most clearly shown in FIG. 1).

Figure 7:
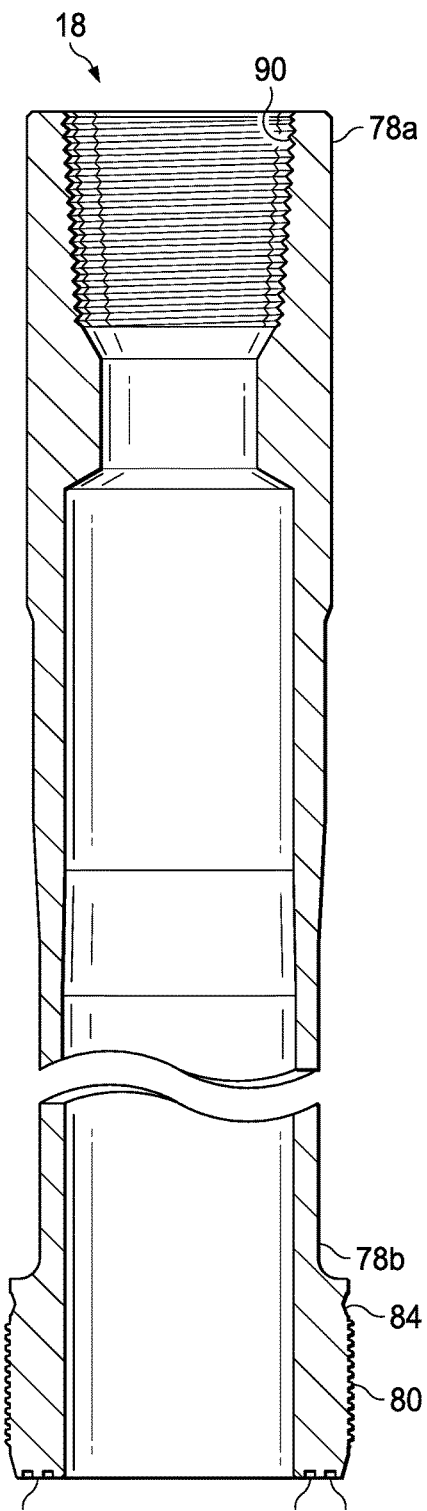
FIG. 7 is a sectional view of the large pipe of FIG. 1, according to an exemplary embodiment.

In an exemplary embodiment, as illustrated in FIG. 7 with continuing reference to FIG. 1, the large pipe 18 is a generally tubular member defining upper and lower end portions 78a and 78b. An external threaded connection 80 is formed in the exterior of the large pipe 18 at the lower end portion 78b thereof, and is adapted to engage the internal threaded connection 68 of the lower pin sub 16. In an exemplary embodiment, the external threaded connection 80 is 8¼" stub acme LH thread; in several exemplary embodiments, other thread types and/or sizes may be used. An end face 82 and an annular notch 84 are also formed in the exterior of the large pipe 18 at the lower end portion 78b thereof. In an exemplary embodiment, the end face 82 adjoins the external threaded connection 80. A pair of annular grooves 86 and 88 are formed in the end face 82 and are adapted to accommodate sealing elements 87 and 89 (shown in FIG. 10), respectively, for sealing engagement with the internal shoulder 70 of the lower pin sub 16. The annular notch 84 is located on a side of the external threaded connection 80 opposite the end face 82, as is adapted to align with the threaded holes 74 in the lower pin sub 16. In an exemplary embodiment, the annular notch 84 adjoins the external threaded connection 80. However, the end face 82 and the annular notch 84 need not adjoin the external threaded connection 80.

The large pipe 18 further includes an upper box connection 90 at the upper end portion 78a thereof. In an exemplary embodiment the upper box connection 90 is a 4½" IF internal threaded connection. In several exemplary embodiments, instead of a 4½" IF internal threaded connection, the upper box connection 90 is one of a wide variety of other types and/or sizes of threaded connections. In an exemplary embodiment, the large pipe 18 is 6⅝" pipe. In several exemplary embodiments, the large pipe 18 may be a wide variety of sizes, greater in size than 6⅝" pipe or less in size than 6⅝" pipe.

Figure 8:
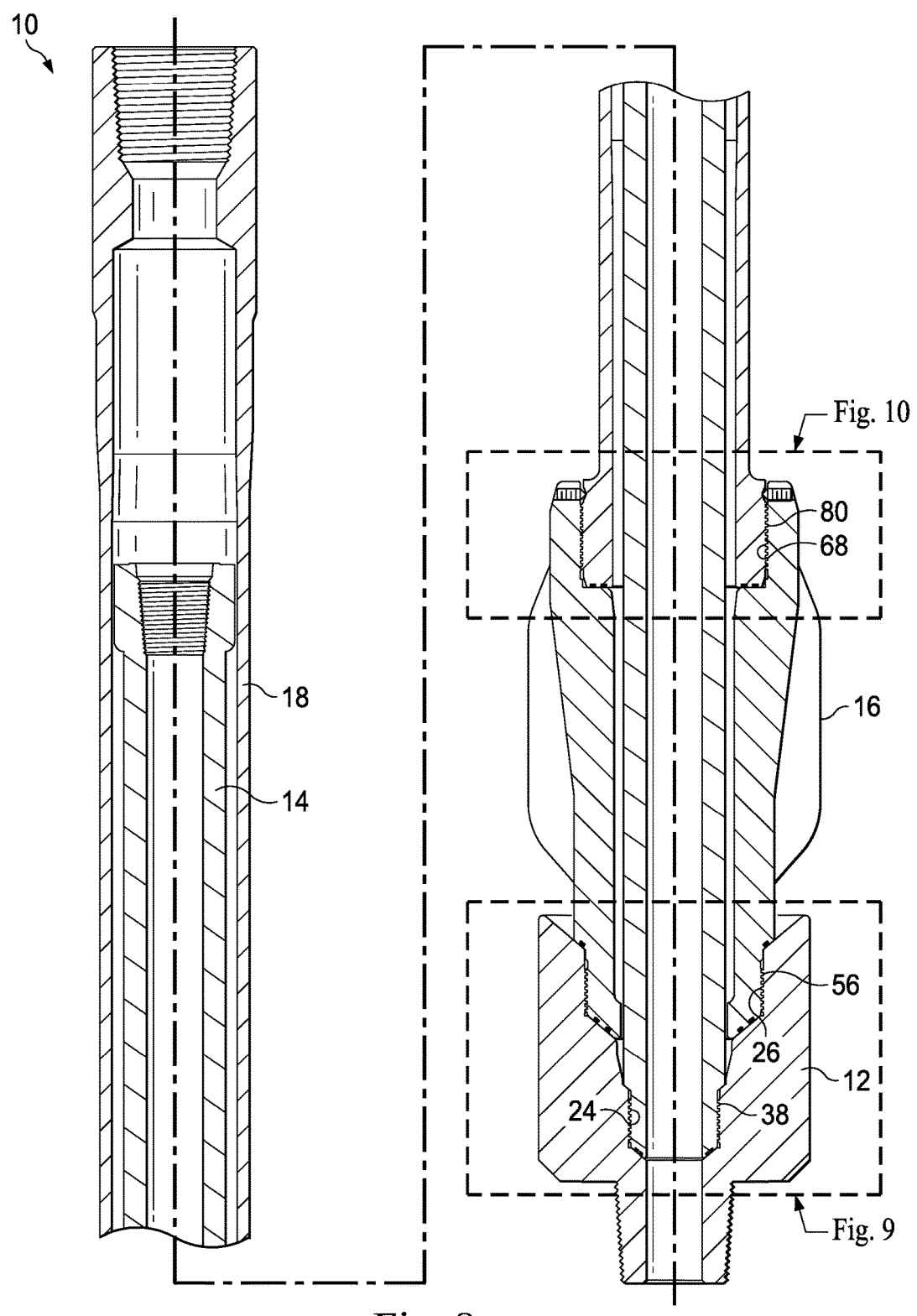
FIG. 8 is a sectional view of the test tool of FIGS. 1-7 in a first operational configuration, according to an exemplary embodiment.
Figure 9:
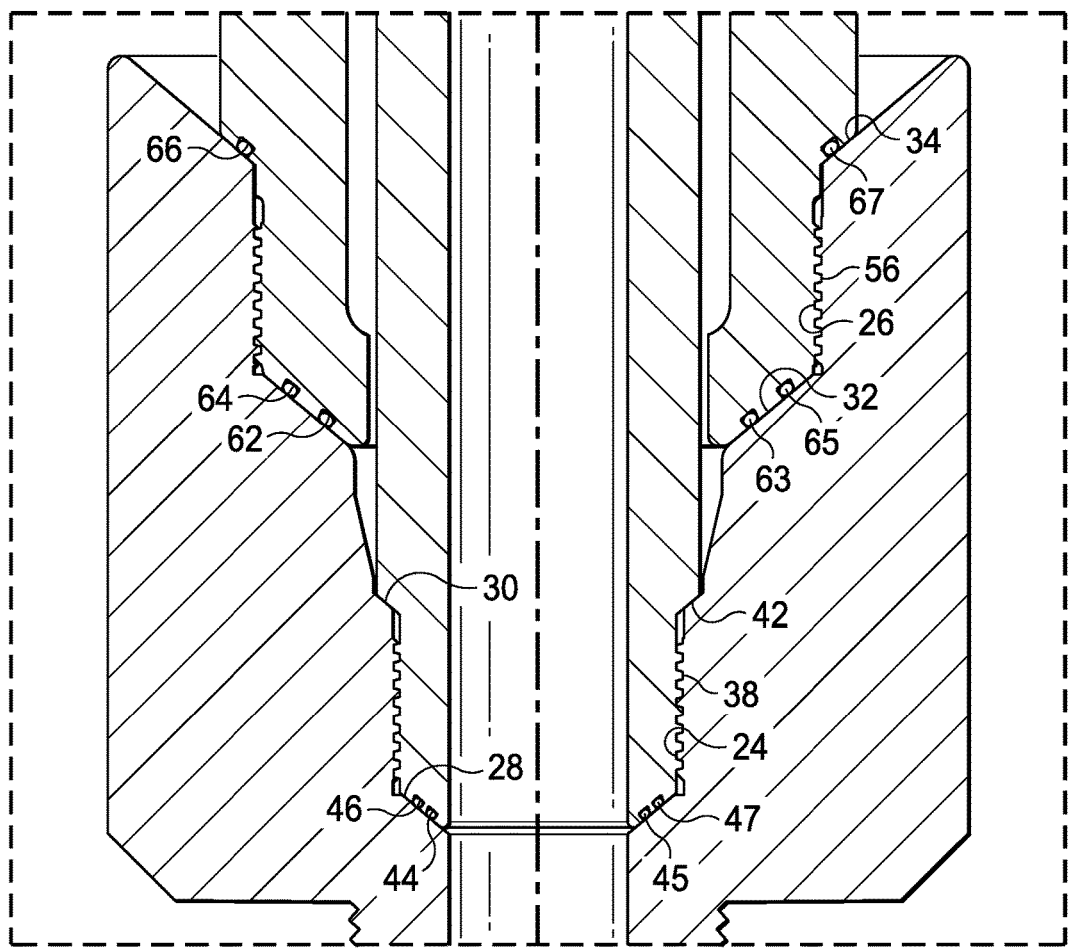
FIG. 9 is an enlarged view of a portion of FIG. 8, according to an exemplary embodiment.
Figure 10:
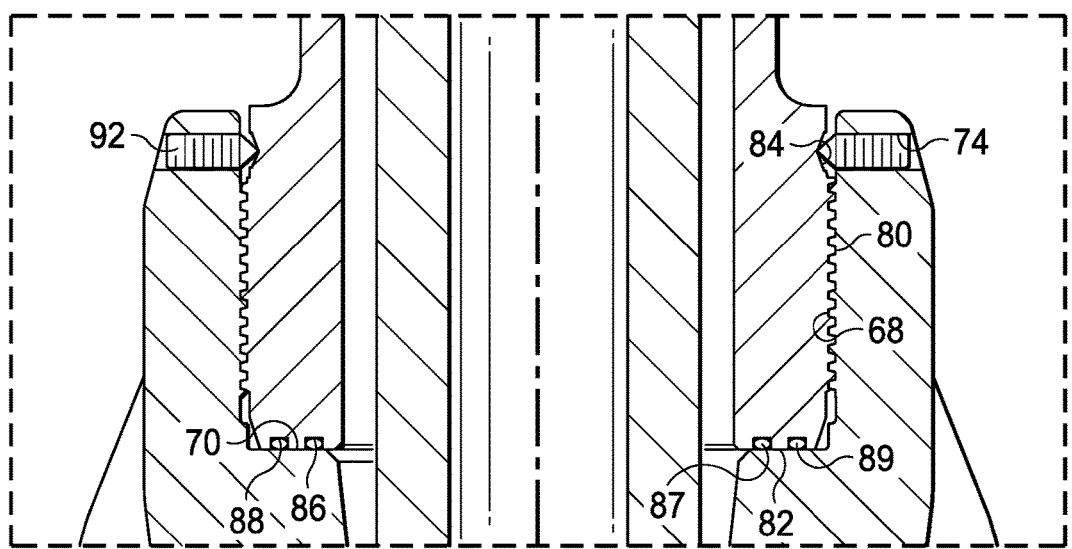
FIG. 10 is an enlarged view of another portion of FIG. 8, according to an exemplary embodiment.

Turning to FIGS. 8-10, with continuing reference to FIGS. 1-7, the test tool 10 is illustrated in a first operational (or "run-in") configuration, in which the small pipe 14 is connected to the bottom sub 12 and positioned in a first axial position relative to the bottom sub 12, and the lower pin sub 16 is connected to the bottom sub 12 and positioned in a first axial position relative to the small pipe 14. In several exemplary embodiments, the first operational configuration of the test tool 10 is characterized by the small pipe 14 being connected to the bottom sub 12, the lower pin sub 16 being connected to the bottom sub 12, the large pipe 18 being connected to the lower pin sub 16, and the small pipe 14 extending within the bottom sub 12, the lower pin sub 16, and the large pipe 18. More particularly, the external threaded connection 38 of the small pipe 14 threadably engages the internal threaded connection 24 of the bottom sub 12 so that the sealing elements 45 and 47 in the annular grooves 44 and 46, respectively, of the small pipe 14 sealingly engage the surface 28 of the bottom sub 12, and the surface 42 of the small pipe 14 engages (or nearly engages) the surface 30 of the bottom sub 12 (most clearly shown in FIG. 9). In several exemplary embodiments, one or both of the sealing elements 45 and 47 in the annular grooves 44 and 46 form a metal-to-metal seal with the surface 28 of the bottom sub 12. However, the sealing element 47 in the annular groove 46 may be an elastomeric back-up seal. As a result, the small pipe 14 sealingly engages the bottom sub 12.

In several exemplary embodiments, the strength of the sealing engagement between the surface 28 of the bottom sub 12 and the sealing elements 45 and 47 in the annular grooves 44 and 46 is improved by the angle $\alpha 2$ of the surface 28 with respect to the longitudinal axis 20c, the angle $\beta 1$ of the surface 40 with respect to the longitudinal axis 36c, the configuration of the sealing elements 45 and 47 in the annular grooves 44 and 46, or any combination thereof. This improved sealing arrangement is not limited to the test tool 10, and may be incorporated into other oil and gas equipment and/or downhole tools.

In several exemplary embodiments, a high pressure low torque (HPLT) connection of the test tool 10 is facilitated by the combination of: the threaded engagement between the external threaded connection 38 of the small pipe 14 and the internal threaded connection 24 of the bottom sub 12; and the sealing engagement between the surface 28 of the bottom sub 12 and the sealing elements 45 and 47 in the annular grooves 44 and 46. This HPLT connection is made possible, at least in part, by the angle $\alpha 2$ of the surface 28 with respect to the longitudinal axis 20c, the angle $\beta 1$ of the surface 40 with respect to the longitudinal axis 36c, the configuration of the sealing elements 45 and 47 in the annular grooves 44 and 46, or any combination thereof. In operation, the application of a torque not exceeding 3,000 ft-lbs to connect the small pipe 14 to the bottom sub 12 enables the HPLT connection therebetween to withstand in situ pressures of up to 25,000 psi. The use of this HPLT connection is not limited to the test tool 10, and may be incorporated into other oil and gas equipment and tools, including downhole tools.

Additionally, the external threaded connection 56 of the lower pin sub 16 threadably engages the internal threaded connection 26 of the bottom sub 12 so that the sealing elements 63 and 65 in the annular grooves 62 and 64, respectively, of the lower pin sub 16 sealingly engage the surface 32 of the bottom sub 12 and the sealing element 67 in the annular groove 66 of the lower pin sub 16 sealingly engages the surface 34 of the bottom sub 12 (most clearly shown in FIG. 9). In several exemplary embodiments, one or both of the sealing elements 63 and 65 in the annular grooves 62 and 64 form a metal-to-metal seal with the surface 32 of the bottom sub 12. Moreover, in several exemplary embodiments, the sealing element 67 in the annular groove 66 forms a metal-to-metal seal with the surface 34 of the bottom sub 12. However, the sealing elements 65 and 67 in the annular grooves 64 and 66, respectively, may be elastomeric back-up seals. As a result, the lower pin sub 16 extends about the small pipe 14 and sealingly engages the bottom sub 12.

In several exemplary embodiments, the strength of the sealing engagement between the surface 32 of the bottom sub 12 and the sealing elements 63 and 65 in the annular grooves 62 and 64 is improved by the angle $\alpha 3$ of the surface 32 with respect to the longitudinal axis 20c, the angle $\gamma 1$ of the surface 58 with respect to the longitudinal axis 54c, the configuration of the sealing elements 63 and 65 in the annular grooves 62 and 64, or any combination thereof. In several exemplary embodiments, the strength of the sealing engagement between the surface 34 of the bottom sub 12 and the sealing element 67 in the annular groove 66 is improved by the angle α4 of the surface 34 with respect to the longitudinal axis 20c, the angle γ2 of the surface 60 with respect to the longitudinal axis 54c, the configuration of the sealing element 67 in the annular groove 66, or any combination thereof. These improved sealing arrangements are not limited to the test tool 10, and may be incorporated into other oil and gas equipment and tools, including downhole tools.

In several exemplary embodiments, another HPLT connection of the test tool 10 is facilitated by the combination of: the threaded engagement between the external threaded connection 56 of the lower pin sub 16 and the internal threaded connection 26 of the bottom sub 12; and the sealing engagement between the surface 32 of the bottom sub 12 and one or both of the sealing elements 63 and 65 in the annular grooves 62 and 64. This HPLT connection is made possible, at least in part, by the angle α3 of the surface 32 with respect to the longitudinal axis 20c, the angle γ1 of the surface 58 with respect to the longitudinal axis 54c, the configuration of one or both of the sealing elements 63 and 65 in the annular grooves 62 and 64, or any combination thereof. In several exemplary embodiments, the another HPLT connection of the test tool 10 is also facilitated by the sealing engagement between the surface 34 of the bottom sub 12 and the sealing element 67 in the annular groove 66. In such embodiments, the another HPLT connection is made possible, at least in part, by the angle α4 of the surface 34 with respect to the longitudinal axis 20c, the angle γ2 of the surface 60 with respect to the longitudinal axis 54c, the configuration of the sealing element 67 in the annular groove 66, or any combination thereof. In operation, the application of a torque not exceeding 3,000 ft-lbs to connect the lower pin sub 16 to the bottom sub 12 enables the HPLT connection therebetween to withstand in situ pressures of up to 25,000 psi. The use of this HPLT connection is not limited to the test tool 10, and may be incorporated into other oil and gas equipment and/or downhole tools.

Finally, the external threaded connection 80 of the large pipe 18 threadably engages the internal threaded connection 68 of the lower pin sub 16 so that the sealing elements 87 and 89 in the annular grooves 86 and 88, respectively, of the large pipe 18 sealingly engage the internal shoulder 70 of the lower pin sub 16 and the annular notch 84 in the large pipe 18 aligns with the threaded holes 74 in the lower pin sub 16 (most clearly shown in FIG. 10). A plurality of set screws 92 are threadably engaged with the threaded holes 74 and extend within the annular notch 84 to maintain the threaded engagement between the external threaded connection 80 and the internal threaded connection 68. As a result, the large pipe 18 extends about the small pipe 14 and sealingly engages the lower pin sub 16.

Figure 11:
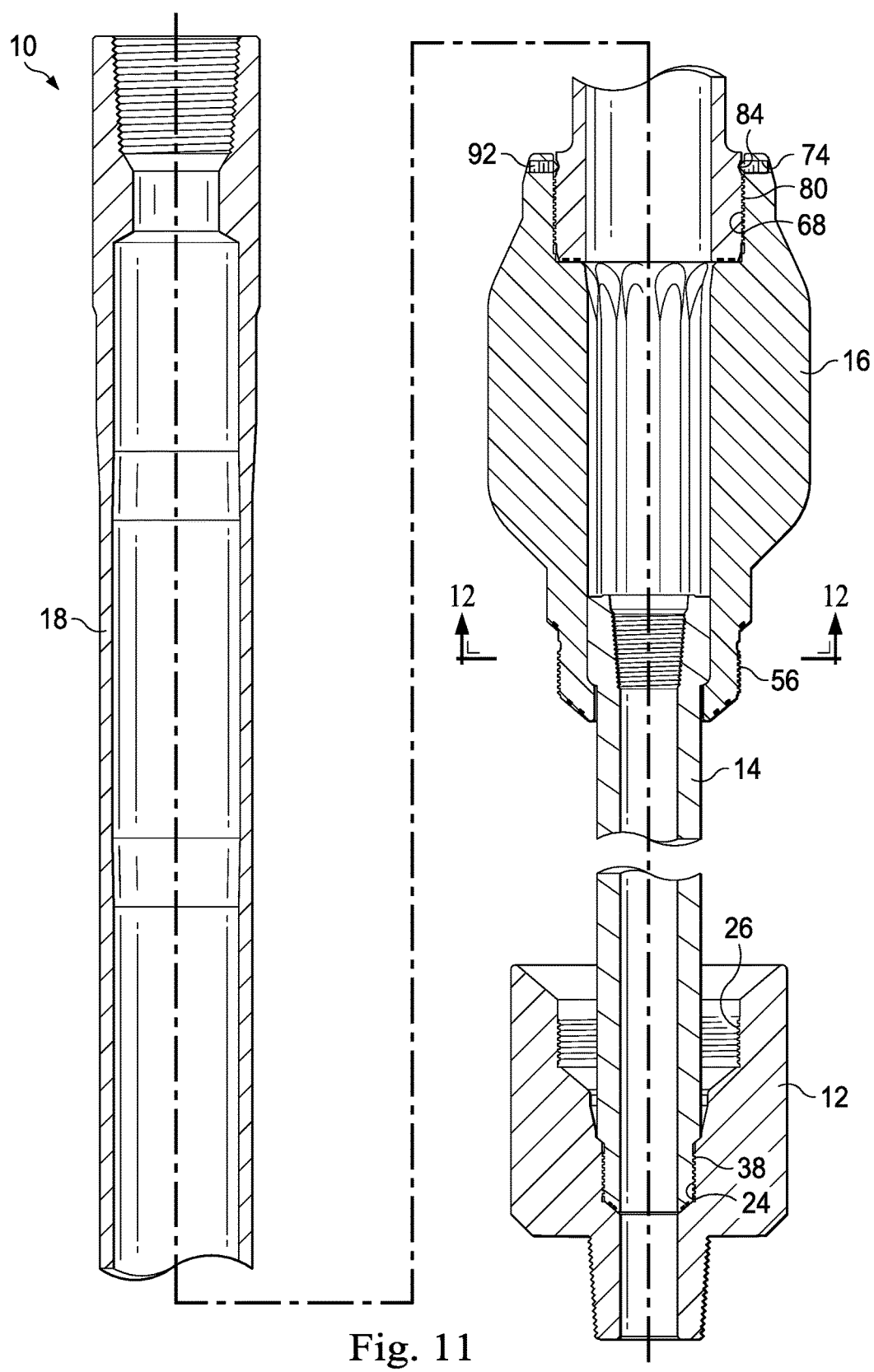
FIG. 11 is a sectional view of the test tool of FIGS. 1-7 in a second operational configuration, according to an exemplary embodiment.

Turning to FIGS. 11 and 12, the test tool 10 is illustrated in a second operational configuration, in which the small pipe 14 is connected to the bottom sub 12 and positioned in the first axial position relative to the bottom sub 12, and the lower pin sub 16 is disconnected from the bottom sub 12 and positioned in a second axial position relative to the small pipe 14. The internal spline 72 of the lower pin sub 16 engages the external spline 50 of the small pipe 14 when the lower pin sub 16 is in the second axial position relative to the small pipe 14. As a result, torque is transferable from the lower pin sub 16 to the small pipe 14 via at least the engagement between the internal spline 72 and the external spline 50. In several exemplary embodiments, the second operational configuration of the test tool 10 is characterized by the small pipe 14 being connected to the bottom sub 12, the lower pin sub 16 being disconnected from the bottom sub 12, the large pipe 18 being connected to the lower pin sub 16, and the small pipe 14 extending within the bottom sub 12 and the lower pin sub 16.

More particularly, the external threaded connection 56 of the lower pin sub 16 is disengaged from the internal threaded connection 26 of the bottom sub 12, and the lower pin sub 16 and the large pipe 18 are repositioned relative to the bottom sub 12 and the small pipe 14. As a result, the external spline 50 of the small pipe 14 engages the internal spline 72 of the lower pin sub 16 (shown most clearly in FIG. 12). Additionally, the external threaded connection 38 of the small pipe 14 remains threadably engaged with the internal threaded connection 24 of the bottom sub 12. As a result, the small pipe 14 remains sealingly engaged with the bottom sub 12. Finally, the external threaded connection 80 of the large pipe 18 remains threadably engaged with the internal threaded connection 68 of the lower pin sub 16, and the plurality of set screws 92 remain engaged with the threaded holes 74 and the annular notch 84 to maintain the threaded engagement between the external threaded connection 80 and the internal threaded connection 68. As a result, the large pipe 18 remains sealingly engaged with the lower pin sub 16.

Figure 13:
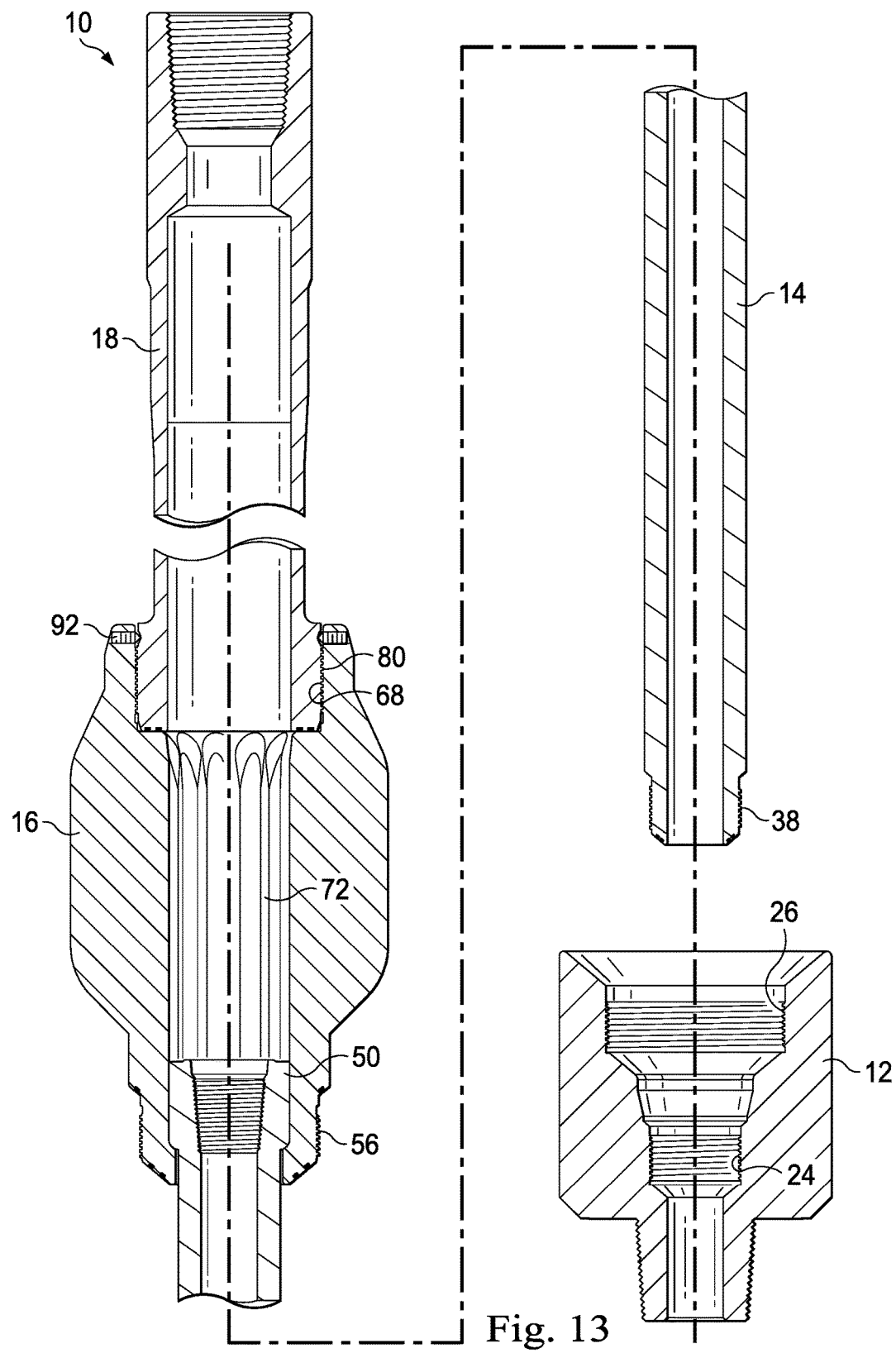
FIG. 13 is a sectional view of the test tool of FIGS. 1-7 in a third operational configuration, according to an exemplary embodiment.

Turning to FIG. 13, the test tool 10 is illustrated in a third operational configuration, in which the small pipe 14 is disconnected from the bottom sub 12 and positioned in a second axial position relative to the bottom sub 12, and the lower pin sub 16 is disconnected from the bottom sub 12 and positioned in the second axial position relative to the small pipe 14. In several exemplary embodiments, the third operational configuration of the test tool 10 is characterized by the small pipe 14 being disconnected from the bottom sub 12, the lower pin sub 16 being disconnected from the bottom sub 12, the large pipe 18 being connected to the lower pin sub 16, and the small pipe 14 extending within the lower pin sub 16. More particularly, the external threaded connection 38 of the small pipe 14 is disengaged from the internal threaded connection 24 of the bottom sub 12, and the small pipe 14, the lower pin sub 16, and the large pipe 18 are repositioned relative to the bottom sub 12. As a result, an empty space is defined between the bottom sub 12 and the small pipe 14. Additionally, the external spline 50 of the small pipe 14 remains engaged with the internal spline 72 of the lower pin sub 16. Indeed, this engagement between the external spline 50 and the internal spline 72 facilitates the actuation of the test tool 10 from the second configuration to the third configuration, as will be discussed in further detail below. Finally, the external threaded connection 80 of the large pipe 18 remains threadably engaged with the internal threaded connection 68 of the lower pin sub 16, and the plurality of set screws 92 remain engaged with the threaded holes 74 and the annular notch 84 to maintain the threaded engagement between the external threaded connection 80 and the internal threaded connection 68. As a result, the large pipe 18 remains sealingly engaged with the lower pin sub 16.

Figure 16:
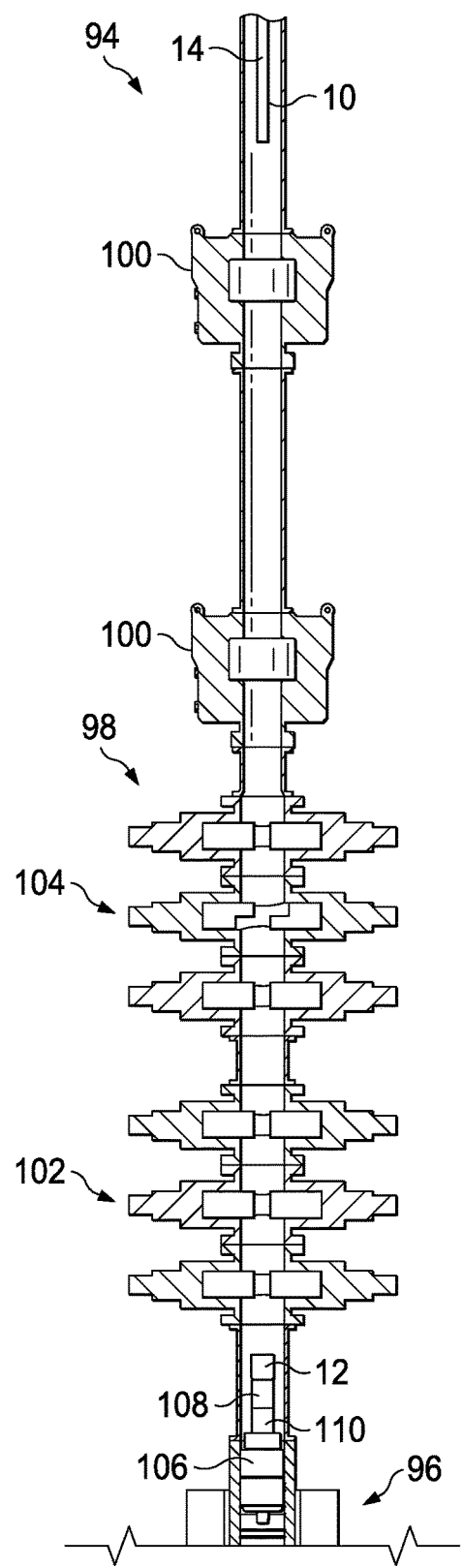
FIG. 16 is an elevational view of the system of FIGS. 14 and 15, the wellhead being sealingly engaged by a plug to which the test tool of FIGS. 1-13 is operably coupled in the third operational configuration, according to an exemplary embodiment.

In an exemplary embodiment, as illustrated in FIGS. 14-16, a system is generally referred to by the reference numeral 94 and includes a wellhead 96 and a blowout preventer (BOP) 98 operably coupled thereto. The wellhead 96 is located at the top or head of an oil and gas wellbore, which penetrates one or more subterranean formations. The wellhead 96 is used in oil and gas exploration and production operations. The wellhead 96 may be a subsea wellhead or a surface wellhead. The wellhead 96 may be located offshore or onshore. The BOP 98 is configured to seal off the wellbore at the top of which the wellhead 96 is disposed in order to, for example, prevent uncontrolled releases of oil and gas from the wellbore (i.e., wellbore blowouts). The BOP 98 may include one or more annular preventers 100, and/or may include one or more rams such as, for example, one or more variable bore rams (VBR) 102, one or more shear rams 104 (including, for example, one or more blind shear rams (BSR) and one or more casing shear rams (CSR)), one or more other types of rams, or any combination thereof. The BOP 98 may be, or include, an annular BOP, a ram BOP, or a combination thereof. The BOP 98 may include any type of BOP stack. In several exemplary embodiments, the system of FIGS. 14-16 includes other components or systems such as, for example, one or more drilling risers.

The wellhead 96 is sealed off, or at least sealingly engaged, by a plug 106 to which the test tool 10 is operably coupled. In several exemplary embodiments, the plug 106 includes one or more sealing elements. In several exemplary embodiments, the lower pin connection 22 of the bottom sub 12 of the test tool 10 is connected to the plug 106. Alternatively, a spacer 108 and/or a crossover 110 may be connected between the test tool 10 and the plug 106. In operation, the test tool 10 is used to test the different rams of the BOP 98 to ensure that the BOP 98 is in sufficient working order, as will be discussed in further detail below. The test tool 10 may be used to test a wide variety of rams of the BOP 98 including, but not limited to, the VBR rams 102, the shear rams 104 (including the BSR rams and the CSR rams), other types of rams, or any combination thereof. During testing, at least a portion of the test tool 10 extends within an internal passage defined by the BOP 98. In several exemplary embodiments, the test tool 10 is, or is part of, a tubular string that extends through the BOP 98; in several exemplary embodiments, the tubular string may extend upwards, or in another direction from the BOP 98.

Figure 17:
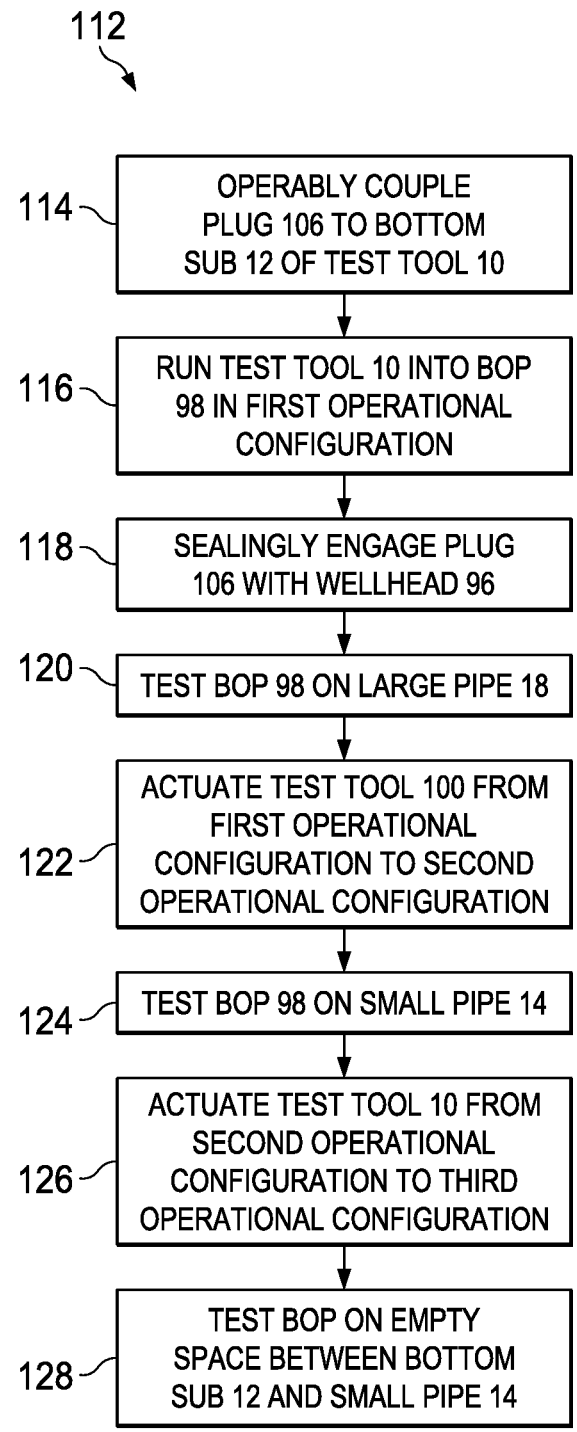
FIG. 17 is a flowchart illustration of a method for testing the BOP of FIGS. 14-16 with the test tool of FIG. 1, according to an exemplary embodiment.

In an exemplary embodiment, as illustrated in FIG. 17 with continuing reference to FIGS. 14-16, a method of testing the BOP 98 is generally referred to by the reference numeral 112 and includes operably coupling the plug 106 to the bottom sub 12 of the test tool 10 at step 114; running the test tool 10 into the BOP 98 in the first operational configuration at step 116; sealingly engaging the plug 106 with the wellhead 96 at step 118; testing the BOP 98 on the large pipe 18 at step 120; actuating the test tool 10 from the first operational configuration to the second operational configuration at step 122; testing the BOP 98 on the small pipe 14 at step 124; actuating the test tool 10 from the second operational configuration to the third operational configuration at step 126; and testing the BOP on the empty space between the bottom sub 12 and the small pipe 14 at step 128.

In an exemplary embodiment of the step 114, the plug 106 is operably coupled to the bottom sub 12 of the test tool 10. More particularly, the test tool 10 is connected to the plug 106 using the lower pin connection 22 at the lower end portion 20b of the bottom sub 12.

In an exemplary embodiment of the step 116, the test tool 10 is run into the BOP 98 in the first operational configuration (shown in FIGS. 8-10). More particularly, in the first operational configuration, the small pipe 14 is connected to the bottom sub 12 and positioned in the first axial position relative to the bottom sub 12, the large pipe 18 is connected to the lower pin sub 16, and the lower pin sub 16 is connected to the bottom sub 12 and positioned in the first axial position relative to the small pipe 14 so that the small pipe 14 extends within the bottom sub 12, the lower pin sub 16, and the large pipe 18. As a result, the test tool 10 extends within the BOP 98 and is connected to the plug 106.

In an exemplary embodiment of the step 118, the plug 106 is sealingly engaged with the wellhead 96. In several exemplary embodiments, sealingly engaging the plug 106 with the wellhead 96 seals off the wellhead 96.

In an exemplary embodiment of the step 120, the BOP 98 is tested on the large pipe 18, as shown in FIG. 14. More particularly, when the test tool 10 is in the first operational configuration (shown in FIGS. 8-10), the one or more annular preventers 100 and/or the one or more rams 102 and 104 of the BOP 98 may be tested using the large pipe 18. In several exemplary embodiments, the one or more annular preventers 100 and/or the one or more rams 102 and 104 many engage the outside surface of the large pipe 18. In several exemplary embodiments, the one or more rams 102 and 104 may be or include the VBR pipe rams. In several exemplary embodiments, the large pipe 18 may be filled with fluid during this testing. In several exemplary embodiments, the small pipe 14 may be filled with fluid during this testing. In several exemplary embodiments, the large pipe 18 and the small pipe 14 may be filled with fluid during this testing.

In an exemplary embodiment of the step 122, the test tool 10 is actuated from the first operational configuration (shown in FIGS. 8-10) to the second operational configuration (shown in FIGS. 11 and 12). More particularly, after the completion of any desired testing of the one or more annular preventers 100 and/or the one or more rams 102 and 104 of the BOP 98 using the large pipe 18, the lower pin sub 16 is disengaged from the bottom sub 12 by turning or rotating the large pipe 18 (or the string or another tool or device connected to the large pipe 18), and thus the lower pin sub 16 connected thereto, in a first rotational direction. In an exemplary embodiment, the external threaded connection 56 at the lower end portion 54b of the lower pin sub 12 is left-hand (LH) Stub Acme thread, and the lower pin sub 16 is rotated or turned clockwise to effect the disengagement from the bottom sub 12.

Subsequently, the large pipe 18, and thus the lower pin sub 16 connected thereto, are lifted or pulled upwards (moving bottom to top as viewed in FIG. 15), increasing the separation distance between the lower pin sub 16 and the bottom sub 12. As a result, the internal spline 72 of the lower pin sub 16 approaches the external spline 50 of the stop collar 48 at the upper end portion 36a of the small pipe 14, and the internal spline 72 engages the external spline 50. The large pipe 18, and thus the lower pin sub 16 connected thereto, continues to be lifted (moving bottom to top as viewed in FIG. 15) until: the internal spline 72 of the lower pin sub 16 is engaged with the external spline 50 of the stop collar 48 at the upper end portion 36a of the small pipe 14, and a downward axially-facing external surface of the stop collar 48 engages an upward axially-facing internal surface of the lower pin sub 16, which internal surface is at the lower end portion 54b of the lower pin sub 16, proximate the external threaded connection 56 thereof (shown in FIGS. 11 and 12).

As a result, in the second operational configuration, the small pipe 14 is connected to the bottom sub 12 and positioned in the first axial position relative to the bottom sub 12, the large pipe 18 is connected to the lower pin sub 16, and the lower pin sub 16 is disconnected from the bottom sub 12 and positioned in the second axial position relative to the small pipe 14 so that the small pipe 14 extends within the bottom sub 12 and the lower pin sub 16. When the lower pin sub 16 is positioned in the second axial position relative to the small pipe 14, a torque is transferable from the lower pin sub 16 to the small pipe 14. This torque is transferable from the lower pin sub 16 to the small pipe 14 via the engagement between the internal spline 72 of the lower pin sub 16 and the external spline 50 of the small pipe 14 when the lower pin sub 16 is positioned in the second axial position relative to the small pipe 14.

In an exemplary embodiment of the step 124, the BOP 98 is tested on the small pipe 14, as shown in FIG. 15. More particularly, when the test tool 10 is in the second operational configuration (shown in FIGS. 11 and 12), the one or more annular preventers 100 and/or the one or more rams 102 and 104 of the BOP 98 may be tested using the small pipe 14. In several exemplary embodiments, the one or more annular preventers 100 and/or the one or more rams 102 and 104 may engage the outside surface of the small pipe 14. In several exemplary embodiments, the one or more rams 102 and 104 may be the VBR pipe rams. In several exemplary embodiments, the small pipe 14 may be filled with fluid during this testing. In several exemplary embodiments, the large pipe 18 may be filled with fluid during this testing. In several exemplary embodiments, the small pipe 14 and the large pipe 18 may be filled with fluid during this testing.

In an exemplary embodiment of the step 126, the test tool 10 is actuated from the second operational configuration (shown in FIGS. 11 and 12) to the third operational configuration (shown in FIG. 13). More particularly, after the completion of any desired testing of the one or more annular preventers 100 and/or the one or more rams 102 and 104 of the BOP 98 using the small pipe 14, the small pipe 14 is disengaged from the bottom sub 12. The small pipe 14 is rotated or turned in the first rotational direction so that the external threaded connection 38 at the lower end portion 36b of the small pipe 14 is disengaged from the internal threaded connection 24 of the bottom sub 12. In an exemplary embodiment, the first rotational direction in which the small pipe 14 is rotated is a clockwise direction; that is, the small pipe 14 is rotated clockwise so that the small pipe 14 disengages from the bottom sub 12. In an exemplary embodiment, to rotate the small pipe 14, the large pipe 18 (or the string or another tool or device connected to the large pipe 18) is rotated. Since the lower pin sub 16 is connected to the large pipe 18, the lower pin sub 16 also rotates. Since torque is transferable from the lower pin sub 16 to the small pipe 14 via at least the engagement between the internal spline 72 of the lower pin sub 16 and the external spline 50 of the small pipe 14, the small pipe 14 also rotates, causing the small pipe 14 to disengage from the bottom sub 12 (which is connected to the plug 106 that sealingly engages the wellhead 96). In an exemplary embodiment, the external threaded connection 38 at the lower end portion 36b of the small pipe 14 is left-hand (LH) Stub Acme thread, and the small pipe 14 is rotated or turned clockwise to effect the disengagement from the bottom sub 12.

Subsequently, after the small pipe 14 is disengaged from the bottom sub 12, the large pipe 18 is lifted upwards, causing the small pipe 14 to be lifted upwards (bottom to top as viewed in FIG. 16) and away from the bottom sub 12. The connection between the lower pin sub 16 and the large pipe 18 causes the lower pin sub 16 to be lifted upwards in response to the large pipe 18 being lifted upwards. The engagement between the internal surface of the lower pin sub 16 and the external surface of the stop collar 48 of the small pipe 14 causes the small pipe 14 to be lifted upwards in response to the lower pin sub 16 being lifted upwards. The engagement between the internal spline 72 and the external spline 50 prevents appreciable relative rotation between the lower pin sub 16 and the small pipe 14. As shown in FIG. 16, an axial spacing is defined between the lower end portion 36b of the small pipe 14 and the bottom sub 12.

As a result, in the third operational configuration, the small pipe 14 is disconnected from the bottom sub 12 and positioned in the second axial position relative to the bottom sub 12, the large pipe 18 is connected to the lower pin sub 16, and the lower pin sub 16 is disconnected from the bottom sub 12 and positioned in the second axial position relative to the small pipe 14 so that the small pipe 14 extends within the lower pin sub 16. When the small pipe 14 is positioned in the second axial position relative to bottom sub 12, the small pipe 14 is spaced apart from the bottom sub 12.

In an exemplary embodiment of the step 128, the BOP 98 is tested on the empty space between the lower end portion 36b of the small pipe 14 and the bottom sub 12 (shown in FIG. 16). More particularly, when the test tool 10 is in the third operational configuration (shown in FIG. 13), the one or more shear rams 104 of the BOP 98 may be tested using the axial spacing defined between the lower end portion 36b of the small pipe 14 and the bottom sub 12. In several exemplary embodiments, the one or more shear rams 104 may be the blind shear rams (BSR), the casing shear rams (CSR), other types of shear rams, or any combination thereof. In several exemplary embodiments, during the testing of the one or more shear rams 104 of the BOP 98, the one or more shear rams 104 move into the axial spacing defined between the lower end portion 36b of the small pipe 14 and the bottom sub 12. As a result, the test tool 10 is not damaged due to the testing of the shear rams 104 of the BOP 98.

In several exemplary embodiments, after the completion of any desired testing of the one or more shear rams 104 of the BOP 98 using the axial spacing defined between the lower end portion 36b of the small pipe 14 and the bottom sub 12, the method 112 further includes lowering the small pipe 14 back into the bottom sub 12. However, no threaded engagement is made between the external threaded connection 38 of the small pipe 14 and the internal threaded connection 24 of the bottom sub 12. The large pipe 18 is lowered, causing the lower pin sub 16 and the small pipe 14 to be lowered. The lowering is stopped when the small pipe 14 contacts the bottom sub 12.

In several exemplary embodiments, after the small pipe 14 contacts the bottom sub 12, the method 112 further includes lowering the large pipe 18 and the lower pin sub 16, thereby disengaging the internal spline 72 of the lower pin sub 16 from the external spline 50 of the stop collar 48 of the small pipe 14. After further lowering, the external threaded connection 56 of the lower pin sub 16 is threadably engaged with the internal threaded connection 26 of the bottom sub 12. In an exemplary embodiment, the respective threaded connections 26 and 56 are left hand threads and the large pipe 18, and thus the lower pin sub 16, are rotated counter-clockwise to effect the threaded engagement between the external threaded connection 56 and the internal threaded connection 26. Subsequently, the test tool 10 is pulled up and out of the BOP 98.

During the above-described operation of the test tool 10, the centralizer 76 of the lower pin sub 16 centralizes the test tool 10 within the internal passage defined by the BOP 98.

In several exemplary embodiments, the above-described operation of the test tool 10 facilitates testing of the one or more annular preventer 100 and/or the one or more rams 102 and 104 of BOP 98 in a single trip.

In several exemplary embodiments, the small pipe 14 and the large pipe 18 are used to test the one or more rams 102 and 104 in the BOP 98, which rams 102 and 104 engage the exterior surface of the small pipe 14 and/or the large pipe 18. In several exemplary embodiments, in addition to the small pipe 14 and the large pipe 18, additional pipes or tubes may be added to the test tool 10 to be used to test the one or more rams 102 and 104. In several exemplary embodiments, instead of, or in addition to one or both of the small pipe 14 and the large pipe 18, one or more other pipes or tubes of different sizes (less than 4½", greater than 4½", less than 6⅝", greater than 6⅝", etc.) may be included in the test tool 10.

In several exemplary embodiments, each of thread types and/or threaded connections described above and/or illustrated in the figures may be any type of connection (Stub Acme, All Premium Thread, VAM, Hunting, Teneris, all standard threads and thread types, etc.).

In several exemplary embodiments, each of the components described above and/or illustrated in the figures may be fabricated from a wide variety of materials including, but not limited to, one or more metallic materials, one or more plastic materials, one or more steel alloys, one or more aluminum alloys, or any combination thereof.

In several exemplary embodiments, the test tool 10 is a universal BOP test tool in that is capable of testing a wide variety of rams of a BOP using either axial spacing and/or pipes having a wide range of sizes.

In an exemplary embodiment, a method includes testing one or more rams of a BOP with the largest-sized pipe or tube of a test tool, then testing one or more rams of the BOP using the second largest-sized pipe or tube of the test tool, then testing one or more rams of the BOP using the third largest-sized pipe or tube of the test tool, and so on until the smallest-sized pipe or tube has been used to test one or more rams of the BOP, after which an axial spacing is defined between the smallest-sized pipe or tube and the bottom sub, and one or more shear rams of the BOP are tested by moving the one or more shear rams into the axial spacing. The above-described test tool 10 may be used to carry out this method, and additional tubes and corresponding components may be added to the test tool 10 (as necessary or required).

The present disclosure introduces a test tool for a blowout preventer, the test tool including a first sub; a first pipe adapted to be connected to, and disconnected from, the first sub, the first pipe including an external spline; a second sub adapted to be connected to, and disconnected from, the first sub, the second sub including an internal spline adapted to engage the external spline of the first pipe so that a torque is transferable from the second sub to the first pipe; and a second pipe adapted to be connected to the second sub. In an exemplary embodiment, when the first pipe is connected to the first sub, an external threaded connection of the first pipe is connected to a first internal threaded connection of the first sub; and, when the second sub is connected to the first sub, an external threaded connection of the second sub is connected to a second internal threaded connection of the first sub. In an exemplary embodiment, when the external threaded connection of the first pipe is connected to the first internal threaded connection of the first sub: first and second generally frusto-conical surfaces of the first sub are engaged, or nearly engaged, by first and second generally frusto-conical surfaces of the first pipe; and one or more sealing elements extending within one or more annular grooves in the first surface of the first pipe sealingly engage the first surface of the first sub. In an exemplary embodiment, when the external threaded connection of the second sub is connected to the second internal threaded connection of the first sub: third and fourth generally frusto-conical surfaces of the first sub are engaged, or nearly engaged, by first and second generally frusto-conical surfaces of the second sub; and one or more sealing elements extending within one or more annular grooves in the first and second surfaces of the second sub sealingly engage the third and fourth surfaces of the first sub. In an exemplary embodiment, the test tool further includes a first operational configuration in which: the first pipe is connected to the first sub and positioned in a first axial position relative to the first sub; the second pipe is connected to the second sub; and the second sub is connected to the first sub and positioned in a first axial position relative to the first pipe so that the first pipe extends within the first sub, the second sub, and the second pipe. In an exemplary embodiment, the test tool further includes a second operational configuration in which: the first pipe is connected to the first sub and positioned in the first axial position relative to the first sub; the second pipe is connected to the second sub; and the second sub is disconnected from the first sub and positioned in a second axial position relative to the first pipe so that the first pipe extends within the first sub and the second sub. In an exemplary embodiment, when the second sub is positioned in the second axial position relative to the first pipe, the internal spline of the second sub engages the external spline of the first pipe so that the torque is transferable from the second sub to the first pipe via at least the engagement between the internal spline and the external spline. In an exemplary embodiment, the test tool further includes a third operational configuration in which: the first pipe is disconnected from the first sub and positioned in a second axial position relative to the first sub; the second pipe is connected to the second sub; and the second sub is disconnected from the first sub and positioned in the second axial position relative to the first pipe so that the first pipe extends within the second sub. In an exemplary embodiment, when the first pipe is positioned in the second axial position relative to first sub, the first pipe is spaced apart from the first sub.

The present disclosure also introduces a tool for testing a blowout preventer operably coupled to a wellhead, the tool including a first sub adapted to be connected to a plug that sealingly engages the wellhead; a first pipe adapted to be connected to, and disconnected from, the first sub; a second sub adapted to be connected to, and disconnected from, the first sub; and a second pipe adapted to be connected to the second sub; a first operational configuration in which: the first pipe is connected to the first sub and positioned in a first axial position relative to the first sub; the second pipe is connected to the second sub; and the second sub is connected to the first sub and positioned in a first axial position relative to the first pipe so that the first pipe extends within the first sub, the second sub, and the second pipe; and a second operational configuration in which: the first pipe is connected to the first sub and positioned in the first axial position relative to the first sub; the second pipe is connected to the second sub; and the second sub is disconnected from the first sub and positioned in a second axial position relative to the first pipe so that the first pipe extends within the first sub and the second sub, wherein, when the second sub is positioned in the second axial position relative to the first pipe, a torque is transferable from the second sub to the first pipe. In an exemplary embodiment, the torque is transferable from the second sub to the first pipe via an engagement between an internal spline of the second sub and an external spline of the first pipe when the second sub is positioned in the second axial position relative to the first pipe. In an exemplary embodiment, the tool further includes a third operational configuration in which: the first pipe is disconnected from the first sub and positioned in a second axial position relative to the first sub; the second pipe is connected to the second sub; and the second sub is disconnected from the first sub and positioned in the second axial position relative to the first pipe so that the first pipe extends within the second sub. In an exemplary embodiment, when the first pipe is positioned in the second axial position relative to first sub, the first pipe is spaced apart from the first sub. In an exemplary embodiment, when the first pipe is connected to the first sub, an external threaded connection of the first pipe is connected to a first internal threaded connection of the first sub; and, when the second sub is connected to the first sub, an external threaded connection of the second sub is connected to a second internal threaded connection of the first sub. In an exemplary embodiment, when the external threaded connection of the first pipe is connected to the first internal threaded connection of the first sub: first and second generally frusto-conical surfaces of the first sub are engaged, or nearly engaged, by first and second generally frusto-conical surfaces of the first pipe; and one or more sealing elements extending within one or more annular grooves in the first surface of the first pipe sealingly engage the first surface of the first sub. In an exemplary embodiment, when the external threaded connection of the second sub is connected to the second internal threaded connection of the first sub: third and fourth generally frusto-conical surfaces of the first sub are engaged, or nearly engaged, by first and second generally frusto-conical surfaces of the second sub; and one or more sealing elements extending within one or more annular grooves in the first and second surfaces of the second sub sealingly engage the third and fourth surfaces of the first sub.

The present disclosure also introduces a method of testing a blowout preventer (BOP), the method including providing a test tool, the test tool including: a first sub; a first pipe adapted to be connected to, and disconnected from, the first sub; a second sub adapted to be connected to, and disconnected from, the first sub; and a second pipe adapted to be connected to the second sub; running the test tool into the BOP in a first operational configuration in which: the first pipe is connected to the first sub and positioned in a first axial position relative to the first sub; the second pipe is connected to the second sub; and the second sub is connected to the first sub and positioned in a first axial position relative to the first pipe so that the first pipe extends within the first sub, the second sub, and the second pipe; and actuating the test tool from the first operational configuration to a second operational configuration in which: the first pipe is connected to the first sub and positioned in the first axial position relative to the first sub; the second pipe is connected to the second sub; and the second sub is disconnected from the first sub and positioned in a second axial position relative to the first pipe so that the first pipe extends within the first sub and the second sub, wherein, when the second sub is positioned in the second axial position relative to the first pipe, a torque is transferable from the second sub to the first pipe. In an exemplary embodiment, the method further includes actuating the test tool from the second operational configuration to a third operational configuration in which: the first pipe is disconnected from the first sub and positioned in a second axial position relative to the first sub; the second pipe is connected to the second sub; and the second sub is disconnected from the first sub and positioned in the second axial position relative to the first pipe so that the first pipe extends within the second sub. In an exemplary embodiment, when the first pipe is positioned in the second axial position relative to first sub, the first pipe is spaced apart from the first sub. In an exemplary embodiment, actuating the test tool from the first operational configuration to the second operational configuration includes: rotating the second sub relative to the first sub to threadably disengage an external threaded connection of the second sub from a first internal threaded connection of the first sub; and axially displacing the second sub relative to the first pipe from the first axial position to the second axial position. In an exemplary embodiment, actuating the test tool from the second operational configuration to the third operational configuration includes: rotating the first pipe relative to the first sub to threadably disengage an external threaded connection of the first pipe from a second internal threaded connection of the first sub; and axially displacing the first pipe relative to the first sub from the first axial position to the second axial position. In an exemplary embodiment, rotating the first pipe relative to the first sub includes transferring the torque from the second sub to the first pipe via an engagement between an internal spline of the second sub and an external spline of the first pipe. In an exemplary embodiment, when the first pipe is connected to the first sub: first and second generally frusto-conical surfaces of the first sub are engaged, or nearly engaged, by first and second generally frusto-conical surfaces of the first pipe; and one or more sealing elements extending within one or more annular grooves in the first surface of the first pipe sealingly engage the first surface of the first sub. In an exemplary embodiment, when the second sub is connected to the first sub: third and fourth generally frusto-conical surfaces of the first sub are engaged, or nearly engaged, by first and second generally frusto-conical surfaces of the second sub; and one or more sealing elements extending within one or more annular grooves in the first and second surfaces of the second sub sealingly engage the third and fourth surfaces of the first sub.

The present disclosure also introduces a method of testing a blowout preventer (BOP) operably coupled to a wellhead, the method including operably coupling a test tool to a plug that is adapted to sealingly engage the wellhead, the test tool including: a first sub; and a first pipe adapted to be connected to, and disconnected from, the first sub; a second sub adapted to be connected to, and disconnected from, the first sub; and a second pipe adapted to be connected to the second sub; sealingly engaging the plug with the wellhead so that the test tool extends within the BOP; testing the BOP on the second pipe when the test tool is in a first operational configuration; testing the BOP on the first pipe when the test tool is in a second operational configuration; testing the BOP in an empty space through which a longitudinal axis of the first sub extends when the test tool in a third operational configuration, the empty space being located between the first pipe and the first sub; and removing the test tool and the plug from the BOP and the wellhead, wherein the test tool is not removed from the BOP and the wellhead until after the plug is sealingly engaged with the wellhead, the BOP is tested on the second pipe, the BOP is tested on the first pipe, and the BOP is tested in the empty space. In an exemplary embodiment, when the test tool is in the first operational configuration: the first pipe is connected to the first sub and positioned in a first axial position relative to the first sub; the second pipe is connected to the second sub; and the second sub is connected to the first sub and positioned in a first axial position relative to the first pipe so that the first pipe extends within the first sub, the second sub, and the second pipe. In an exemplary embodiment, when the first pipe is connected to the first sub: first and second generally frusto-conical surfaces of the first sub are engaged, or nearly engaged, by first and second generally frusto-conical surfaces of the first pipe; and one or more sealing elements extending within one or more annular grooves in the first surface of the first pipe sealingly engage the first surface of the first sub. In an exemplary embodiment, when the second sub is connected to the first sub: third and fourth generally frusto-conical surfaces of the first sub are engaged, or nearly engaged, by first and second generally frusto-conical surfaces of the second sub; and one or more sealing elements extending within one or more annular grooves in the first and second surfaces of the second sub sealingly engage the third and fourth surfaces, respectively, of the first sub. In an exemplary embodiment, after testing the BOP on the second pipe, the method further includes: actuating the test tool from the first operational configuration to the second operational configuration; and, when the test tool is in the second operational configuration: the first pipe is connected to the first sub and positioned in the first axial position relative to the first sub; the second pipe is connected to the second sub; and the second sub is disconnected from the first sub and positioned in a second axial position relative to the first pipe so that the first pipe extends within the first sub and the second sub. In an exemplary embodiment, actuating the test tool from the first operational configuration to the second operational configuration includes: rotating the second sub relative to the first sub to threadably disengage an external threaded connection of the second sub from a first internal threaded connection of the first sub; and axially displacing the second sub relative to the first pipe from the first axial position to the second axial position. In an exemplary embodiment, when the second sub is positioned in the second axial position relative to the first pipe, a torque is transferable from the second sub to the first pipe. In an exemplary embodiment, after testing the BOP on the first pipe, the method further includes actuating the test tool from the second operational configuration to the third operational configuration; and wherein, when the test tool is in the third operational configuration: the first pipe is disconnected from the first sub and positioned in a second axial position relative to the first sub; the second pipe is connected to the second sub; and the second sub is disconnected from the first sub and positioned in the second axial position relative to the first pipe so that the first pipe extends within the second sub. In an exemplary embodiment, actuating the test tool from the second operational configuration to the third operational configuration includes: rotating the first pipe relative to the first sub to threadably disengage an external threaded connection of the first pipe from a second internal threaded connection of the first sub; and axially displacing the first pipe relative to the first sub from the first axial position to the second axial position. In an exemplary embodiment, rotating the first pipe relative to the first sub includes transferring a torque from the second sub to the first pipe via a complementary engagement between an internal spline of the second sub and an external spline of the first pipe.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A test tool for a blowout preventer, the test tool comprising:
   a first sub;
   a first pipe disconnectably connected to the first sub and positioned in a first axial position relative to the first sub, the first pipe comprising an external spline;
   a second sub disconnectably connected to the first sub and positioned in a first axial position relative to the first pipe so that the first pipe extends within the first sub, the second sub, and a second pipe, the second sub comprising an internal spline engageable with the external spline of the first pipe so that a torque is transferable from the second sub to the first pipe; and
   the second pipe being connected to the second sub.

2. The test tool of claim 1,
   wherein the first pipe is disconnectably connected to the first sub via a threaded engagement between an external threaded connection of the first pipe and a first internal threaded connection of the first sub; and
   wherein the second sub is disconnectably connected to the first sub via a threaded engagement between an external threaded connection of the second sub and a second internal threaded connection of the first sub.

3. The test tool of claim 2, wherein the threaded engagement between the external threaded connection of the first pipe and the first internal threaded connection of the first sub causes:

first and second generally frusto-conical surfaces of the first sub to be engaged, or nearly engaged, by first and second generally frusto-conical surfaces of the first pipe; and one or more sealing elements extending within one or more annular grooves in the first surface of the first pipe to sealingly engage the first surface of the first sub.

4. The test tool of claim 3, wherein the threaded engagement between the external threaded connection of the second sub and the second internal threaded connection of the first sub causes:

third and fourth generally frusto-conical surfaces of the first sub to be engaged, or nearly engaged, by first and second generally frusto-conical surfaces of the second sub; and one or more sealing elements extending within one or more annular grooves in the first and second surfaces of the second sub to sealingly engage the third and fourth surfaces of the first sub.

5. The test tool of claim 1, wherein the test tool is actuable so that:

the first pipe is disconnectably connected to the first sub and positioned in the first axial position relative to the first sub; and the second sub is disconnected from the first sub and positioned in a second axial position relative to the first pipe so that the first pipe extends within the first sub and the second sub.

6. The test tool of claim 5, wherein the positioning of the second sub in the second axial position relative to the first pipe engages the internal spline of the second sub with the external spline of the first pipe so that the torque is transferable from the second sub to the first pipe via at least the engagement between the internal spline and the external spline.

7. The test tool of claim 5, wherein the test tool is further actuable so that:

the first pipe is disconnected from the first sub and positioned in a second axial position relative to the first sub; and the second sub is disconnected from the first sub and positioned in the second axial position relative to the first pipe so that the first pipe extends within the second sub.

8. The test tool of claim 7, wherein the positioning of the first pipe in the second axial position relative to first sub spaces apart the first pipe from the first sub.

9. The test tool of claim 1, wherein the first pipe is disconnectably connected to the first sub via a threaded engagement between the first pipe and the first sub; and wherein the threaded engagement between the first pipe and the first sub causes a generally frusto-conical surface of the first sub to be engaged, or nearly engaged, by a generally frusto-conical surface of the first pipe.

10. The test tool of claim 9, wherein the threaded engagement between the first pipe and the first sub further causes a sealing element extending within an annular groove in the generally frusto-conical surface of the first pipe to sealingly engage the generally frusto-conical surface of the first sub.

11. The test tool of claim 1, wherein the second sub is disconnectably connected to the first sub via a threaded engagement between the second sub and the first sub; and wherein the threaded engagement between the second sub and the first sub causes a generally frusto-conical surface of the first sub to be engaged, or nearly engaged, by a generally frusto-conical surface of the second sub.

12. The test tool of claim 11, wherein the threaded engagement between the second sub and the first sub further causes a sealing element extending within an annular groove in the generally frusto-conical surface of the second sub to sealingly engage the generally frusto-conical surface of the first sub.

* * * * *